(12) United States Patent
Bungenstock

(10) Patent No.: US 9,541,251 B2
(45) Date of Patent: Jan. 10, 2017

(54) LIGHTING APPLIANCE FOR VEHICLES

(71) Applicant: Hella KGaA Hueck & Co., Lippstadt (DE)

(72) Inventor: Carmen Bungenstock, Kleinenberg (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 191 days.

(21) Appl. No.: 14/160,293

(22) Filed: Jan. 21, 2014

(65) Prior Publication Data

US 2014/0204600 A1 Jul. 24, 2014

(30) Foreign Application Priority Data

Jan. 21, 2013 (DE) .................. 10 2013 100 557

(51) Int. Cl.
*F21S 8/10* (2006.01)
*F21V 8/00* (2006.01)

(52) U.S. Cl.
CPC ............ *F21S 48/234* (2013.01); *F21S 48/215* (2013.01); *F21S 48/2243* (2013.01); *F21S 48/2262* (2013.01); *F21S 48/2281* (2013.01); *G02B 6/002* (2013.01); *G02B 6/0018* (2013.01)

(58) Field of Classification Search
CPC ....... G09F 13/18; G02B 6/006; G02B 6/0076; G02B 6/0036; G02B 6/004; G02B 6/0055; G02B 6/002; G02B 6/0018; F21S 48/234; F21S 48/2243; F21S 48/215; F21S 48/2262; F21S 48/2281
See application file for complete search history.

(56) References Cited

U.S. PATENT DOCUMENTS 4,016,534 A * 4/1977 Kobayashi et al. .......... 340/461
2006/0171159 A1* 8/2006 Anderlini ............... B60Q 1/302
362/511

FOREIGN PATENT DOCUMENTS

| DE | 10318952 A1 | 11/2004 |
|---|---|---|
| DE | 102005042523 A1 | 12/2006 |
| DE | 102006008191 A1 | 8/2007 |
| DE | 102007023181 A1 | 4/2008 |
| DE | 102007013082 A1 | 9/2008 |
| DE | 102007057399 A1 | 5/2009 |
| WO | 2006089450 A2 | 8/2006 |

* cited by examiner

*Primary Examiner* — Stephen F Husar
*Assistant Examiner* — Danielle Allen
(74) *Attorney, Agent, or Firm* — Husch Blackwell LLP

(57) ABSTRACT

A lighting appliance has a flat light guide and multiple light sources radiating light beams and a section for coupling-in light of the flat light guide, wherein the flat light guide has a surface for coupling-in the light beam and a deflecting surface for deflecting the coupled-in light beam toward a main section of the light guide, onto which a surface for coupling-out of light abuts in the light guiding direction, that the main section extends between the section for coupling-in of light and the surface for coupling-out of light has opposing flat sides, on which the coupled-in light beam is fully reflective in direction of the surface for coupling-out of light, wherein the surface for coupling-in of light is embodied so that the coupled-in light beam is directed under a tipping angle relative to a main radiation direction of the light source in the direction of the deflecting surface.

10 Claims, 3 Drawing Sheets

LIGHTING APPLIANCE FOR VEHICLES

CROSS REFERENCE

This application claims priority to German Patent Application No. 10 2013 100 557.8, filed Jan. 21, 2013.

TECHNICAL FIELD OF THE INVENTION

The invention relates to lighting appliances for vehicles with a flat light guide and a multitude of light sources radiating light beams.

BACKGROUND OF THE INVENTION

From DE 102 34 110 B4, a lighting appliance for vehicles is known, which has a flat light guide with a multitude of light sources arranged on its narrow light entrance section. These light sources with their main radiation directions are either arranged, in a distributed manner, directed in the light guiding direction of the flat light guide or transverse to this light guiding direction. In the light entry area, the flat light guide has a section for the coupling-in of light comprising on one hand a surface for the coupling-in of light and on the other hand a deflecting surface for the deflection of the coupled-in light toward an abutting main section of the light guide.

On the end of the main section opposing the section for the coupling-in of light, a section for the coupling-out of light with pillow-optic elements is arranged, from which the light is radiated according to a given light distribution. A disadvantage of the known lighting appliance is that the light sources must be arranged on PCBs oriented in different directions, requiring relatively large assembly cost and effort.

Therefore, the task of the present invention is the further development of a lighting appliance for vehicles with a flat light guide so that the light sources arranged in a light entry area of the flat light guide can be arranged in a common plane, wherein a given light function with a high degree of photometric effectiveness can be generated.

SUMMARY OF THE INVENTION

For the solution of this problem, a surface for the coupling-in of light is embodied so that the coupled-in light beam is directed toward the direction of the deflecting surface under a tipping angle relative to the main radiation direction of the light source.

According to the invention, a surface for the coupling-in of light of the flat light guide is embodied so that a light beam radiated by the light source is deflected by such a tipping angle, that the coupled-in light beam hits the deflecting surface under a sufficiently large angle of incidence, so that it can be directed further in the light guiding direction of the main section of the flat light guide by means of the deflecting surface. Advantageously, this results in a largely loss-free redirection of light on the deflecting surface, as only a small amount of the coupled-in light beam exits at the deflecting surface and is therefore not available for light distribution.

The fundamental idea of the invention is to not only collect the light beam emitted by the light source on the surface for the coupling-in of light, but, furthermore, to direct it so that it enters, on the deflecting surface, under as large as possible an angle of incidence into the given radiation direction into the main section of the flat light guide. Preferably, the given radiation direction coincides with the light guiding direction of the main section, if the main section is flat. If the main section is curved, the given radiation direction coincides with the area of the light guiding direction facing the section for the coupling-in of light.

According to a preferred embodiment of the invention, the surface for the coupling-in of light has a collecting optical surface tilted by the tipping angle relative to the main radiation direction of the light source resulting in a tilting of the light beam relative to the main radiation direction of the light source.

According to a preferred embodiment of the invention, the section for the coupling-in of light has a collecting optical surface tilted by the tipping angle for the coupling-in of a middle partial light beam and peaks arranged on the edges for coupling-in and total reflection of outer partial beams toward the direction of the deflecting surface. By this means, almost the entire light beam radiated by the light source is coupled into the light guide and directed onto the deflecting surface of the same, thus increasing the light efficiency.

According to a further development of the invention, the deflecting surface of the section for the coupling-in of light is embodied so that the coupled-in light beam is deflected into the light guiding direction of the abutting flat main section. By this means, the entire coupled-in light beam can be made available to the main section of the light guide in a parallelized manner.

According to a further development of the invention, the light guide comprises several light sections for the coupling-in of light being arranged next to one another and tapering toward the direction of the light sources, and running transverse relative to the light guiding direction of the main section of the light guide as well as transverse to the main radiation direction of the light sources. Advantageously, this results in a homogeneous light input into the main section.

According to a further embodiment of the invention, the deflecting surface has a multitude of optical strips with a triangular cross-section widening in the direction of the main section of the light guide. Advantageously, this results in a grading of the deflecting surface leading to a widening of the light beam being guided in the main section to the surface for the coupling-out of the light. Said widening is realized in the plane of extension of the main section, so that the narrow surface for the coupling-out of light of the main section can be illuminated more homogeneously. A length of the section of the surface for the coupling-out of light illuminated by the light beam can be enlarged by this means. A homogenization of the luminances on the surface for the coupling-out of light takes place. A further advantage of the grading is that an outer partial light beam coupled-in on the surface for the coupling in of light under a relatively large angle and hitting a peak of the surface for the coupling-in of light, can be caught by the defecting surface and directed in the direction of the main section. With a deflecting surface without grading, the partial light beam would be lost, as it could not be lead into the main section due to the limited thickness of the latter. According to the invention, particularly the deflecting surface resp. the entire section for the coupling-in of light is embodied in a manner which makes a coupling-in being adapted to the thickness of the main section of the light guide possible. Advantageously, this allows the light sources to be arranged at a larger distance relative to one another.

According to a further development of the invention, a further widening of the light beam in the main section of the light guide can take place by means of a balancing reflective surface arranged in the region of a middle plane of the section for the coupling-in of light. By this means a middle partial light beam is deflected in the direction of the narrow lateral sides of the section for the coupling-in of light, so that a relatively light-intensive part is distributed toward the outside. By this means, the length of the section of the surface for the coupling-out of light illuminated by the same light source can be enlarged further, so that larger distances between neighboring light sources become possible.

Advantageously, the section for the coupling-in of light of the light guide allows an improved illumination of boundary areas of sections of the surface for the coupling-out of light being illuminated by two different light sources without the occurrence of dark zones. Furthermore, a homogeneous illumination of the section for the coupling-in of light according to the invention is also realizable with relatively large distances between light sources.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1:
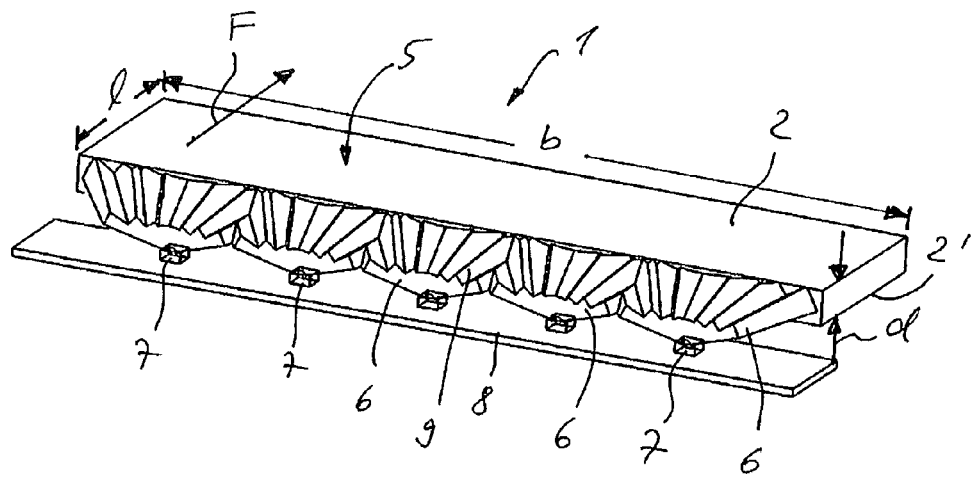
FIG. 1 A perspective rear view of a flat light guide according to a first embodiment of the invention, comprising several sections for the coupling-in of light arranged next to one another, FIG. 2 A perspective front view of the flat light guide, FIG. 3 A top view of the light guide according to FIG. 1 with indicated light beams, FIG. 4 A cross-section through a section for the coupling-in of light of the flat light guide according to FIG. 1, FIG. 5 A perspective top view of a light guide according to a second embodiment and FIG. 6 An enlarged representation of a section for the coupling-in of light of the flat light guide according to a third embodiment.
Figure 2:
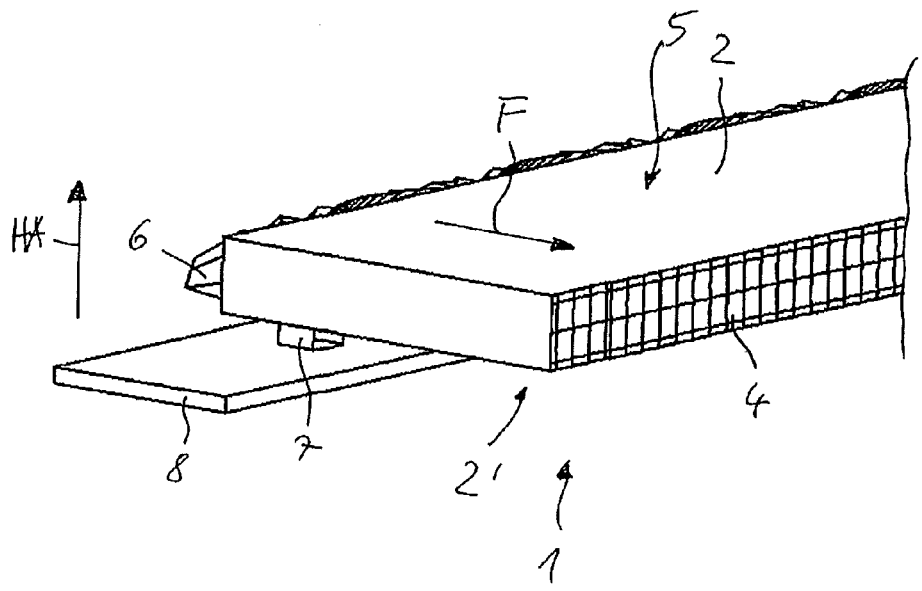

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

A lighting appliance for vehicles according to the invention is mounted in a housing which can be arranged in a rear or front area of a motor vehicle. The lighting appliance according to the invention can be used for the generation of signal functions, in particular for the daytime running light, tail light or stop light function.

The lighting appliance preferably comprises a flat light guide 1 having opposing flat sides 2, 2' on which a coupled-in light beam is deflected toward a narrow surface for the coupling-out of light 4 by means of total reflection. The light guide 1 has a main section 5 being limited by the flat sides 2, 2' and having a width b, a length l and a thickness d. The main section 5 of the light guide 1 extends in a plane which preferably runs horizontal. The main section 5 is essentially embodied in a cuboidal shape.

According to an embodiment of the invention which is not represented, the main section 5 can also be bow-shaped, either partly or throughout, wherein for example the length l varies. The main section 5 of the light guide 1 forms the extension plane of the light guide 1. On a side facing away from the surface for the coupling-out of light 4, a section for the coupling-in of light 6 bends away from the main section 5 under an acute angle toward a light source 7. In the present exemplary execution, a multitude of sections for the coupling-in of light 6 running parallel and transverse relative to a light guiding direction F of the main section 5 and transverse relative to a main radiation direction HA of the light source 7 abut to the main section 5. The light sources 7 being arranged in rows at a distance relative to one another on a common PCB 8 are assigned to the sections for the coupling-in of light 6. The main radiation direction HA of the light sources 7, resp. the optical axes of the same, run at a right angle relative to the light guiding direction F respr. the direction of extension of the main section 5 of the light guide 1.

The section for the coupling-in of light 6 has a deflection surface 9 being arranged on a side of the section for the coupling-in of light 6 facing away from the light source 7. Furthermore, the section for the coupling-in of light 6 comprises a surface for the coupling-in of light 10 on which a light beam 11 being radiated by the light source 7 is coupled into the light guide 1. The section for the coupling-in of light 6 protrudes from the main section 5 in a tapered manner. As is evident from FIG. 3, the lateral edges 17 of neighboring sections for the coupling-in of light 6 facing each other lie immediately next to one another, having a distance a1 relative to one another on a side facing away from the main section 5.

Figure 4:
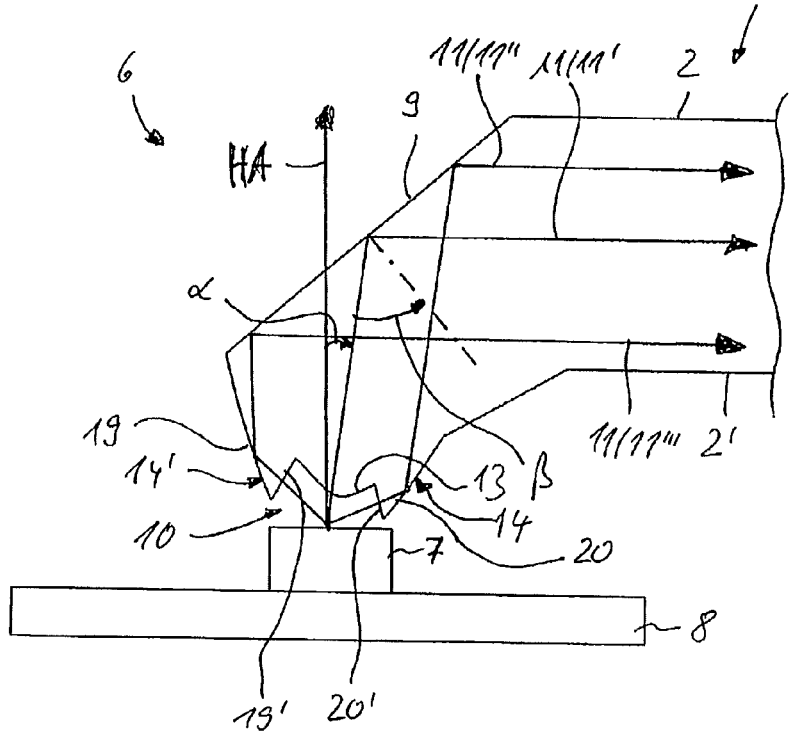

As is evident from FIG. 4, the surface for the coupling-in of light 10 of the section for the coupling-in of light 6 has a collecting optical surface 13 being arranged inclined toward the main radiation direction HA of the light source 7. The collecting optical surface 13 is arranged tilted by an acute tipping angle α in the direction of the main section 5 relative to the main radiation direction HA of the light source 7, so that a middle main light beam 11' of the light beam 11 hits the deflecting surface 9 under a relatively large angle of incidence β. This has the effect that only a relatively small share of the light beam 11 is deflected outward by the deflecting surface 9 and is therefore not usable for the signal function. The angle of incidence β of the middle main light beam 11' hitting the deflecting surface 9 is larger than a critical angle of total reflection on the deflecting surface 9. By this means, the angle of incidence β is so large that the light beam 11' is directed by the deflecting surface 9 in the light guiding direction F to the main section 5.

Furthermore, the surface for the coupling-in of light 10 comprises peaks 14, 14' being situated on both sides of the collecting optical surface 13, by means of which a first outer partial light beam 11" and a second outer partial light beam 11''' of the light beam 11 is directed into the direction of the deflecting surface 9. Herein, the partial light beams 11" and 11''' are each fully reflected on the outer edges 20 resp. 19 of the peaks 14, 14' in the direction of the deflecting surface 9 once they have been deflected on the inner edges 20' resp. 19'.

As can be seen in FIG. 4, the main radiation direction HA of the light beam 11 radiated from the light source 7 runs perpendicular to the light guiding direction F resp. perpendicular to the direction of extension of the main section 5. In an exemplary embodiment of the invention which is not represented, the main radiation direction HA of the light beam 11 can also run at an angle range close to a right angle, for example with a deviation of between 10° and 20°. It is therefore assumed that the main radiation direction HA of the light source 7 resp. of the light beam 11 runs at an acute angle range relative to the extension plane of the main section 5 resp. to the light guiding direction F. The acute angle range does therefore comprise the right angle as well as angles close to a right angle up to +/−20°.

The deflecting surface 9 is embodied so that the coupled-in light beam 11 enters preferably parallel into the abutting main section 5 of the light guide 1. The deflecting surface 9 has several optical strips with a triangular cross-section 15 widening in the direction of the main section 5. The optical strips 15 have two optical surfaces 15', 15" each, forming an edge 16 under an inclusion angle. The inclusion angle of the optical strips 15 grows toward a middle plane M of the section for the coupling-in of light 6.

Therefore, the optical surfaces 15', 15" of the optical strips 15 run flatter relative to one another in the middle area, while they run steeper relative to one another in an opposing outer area.

Figure 3:
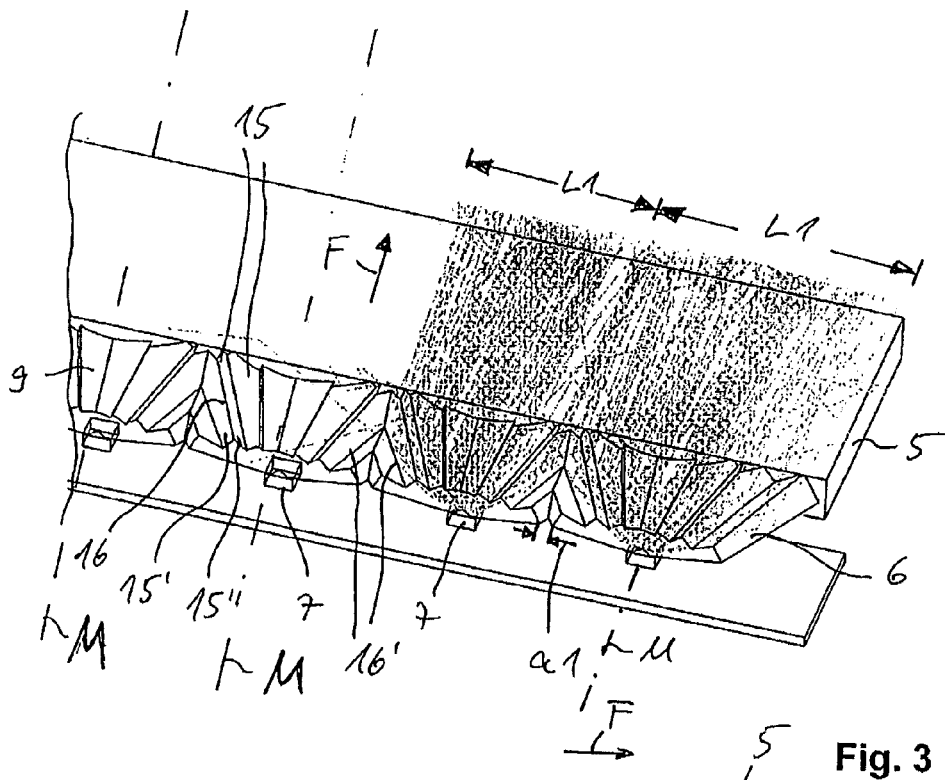

As can be seen in FIG. 3, the edges 16 of the deflecting surfaces 9 run in a fanshaped manner toward the main section 5, wherein lateral edges 16' of neighboring sections for the coupling-in of light 6 abut directly.

It is evident, that lateral edges 17 of neighboring sections for the coupling-in of light 6 abut over along a section being larger than half of the length of these lateral edges 17. These lateral edges 17 of neighboring sections for the coupling-in of light 6 meet already in an area close to the free end of the same. As can be seen in FIG. 3, a length L1 of the section for the coupling-out of light 4 corresponding to the extension of the section for the coupling-in of light 6 transversal to the light guiding direction F is illuminated by means of the light beam 11. As the sections for the coupling-in of light 6 immediately abut, the section for the coupling-out of light 4 is homogeneously illuminated by the parallelized light beam 11. Convex- and/or concave-shaped dispersion optic elements of the surface for the coupling-out of light 4 effect the required dispersion of the light beam 11 according to a given light distribution.

Figure 5:
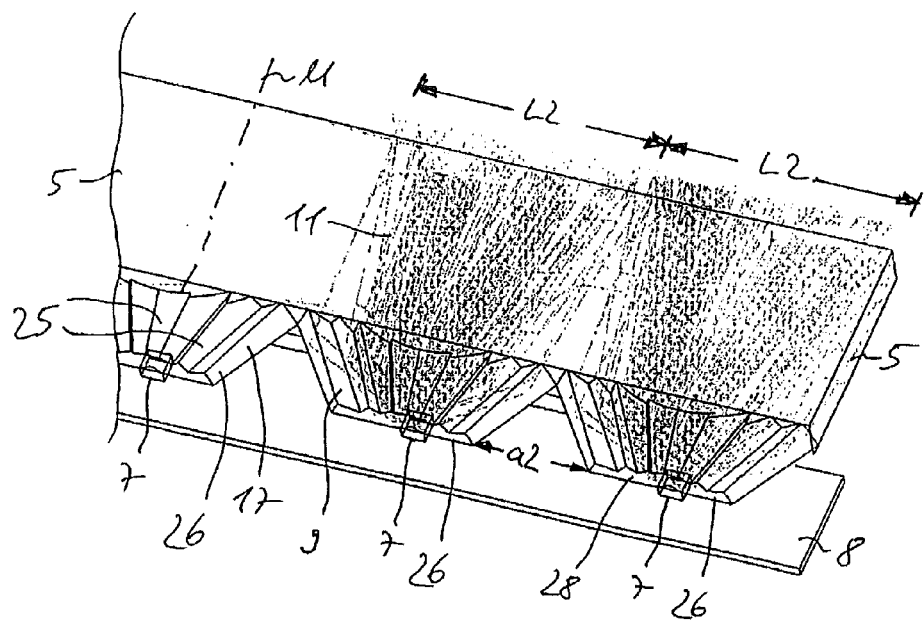

If the length of the area of the surface for the coupling-out of light 4 illuminated by a light source 7 is to be enlarged from L1 to L2 according to FIG. 5, for example because the number of the serially arranged light sources 7 is to be reduced, optical strips 25 of a section for the coupling-in of light 26 can fan out toward the direction of the main section 5 under a larger angle. Free ends of lateral edges 17 of neighboring sections for the coupling-in of light 26 have a distance a2 relative to one another being significantly larger than the distance a1 according to the first embodiment following to the FIGS. 1 to 4.

The light beams 11 according to the embodiment variant according to FIG. 5 do not run parallel, but at an angle of up to 10° relative to the middle plane M. By this means the length L2 of the surface for the coupling-out of light 10 to be illuminated is larger than the extension of the section for the coupling-in of light 26 running perpendicular to the light guiding direction F on a free lateral edge 28 of the section for the coupling-in of light 26.

Identical component parts resp. component part functions of the embodiments have the same reference numbers.

The length L1, L2 of the section of the surface for the coupling-out of light 4 illuminated by a light beam 11 corresponds essentially to the extension of the section for the coupling-in of light 26 on a side facing the main section 5 of the same transverse to the light guiding direction F.

Figure 6:
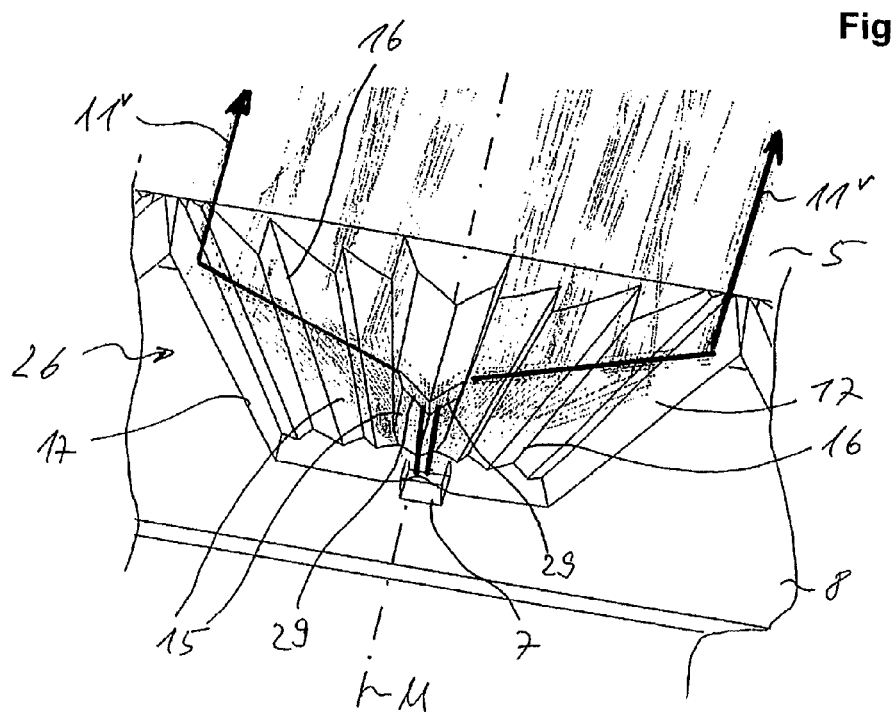

To realize a homogeneous illumination of the surface for the coupling-out of light 4 with larger distances between neighboring light sources 7 when compared to the embodiment according to FIG. 5, the deflecting surface 9 of an embodiment according to the invention according to FIG. 6 comprises, in addition, a wing-shaped, balancing reflective surface 29 in the middle plane M of the section for the coupling-in of light 26. This effects the deflection of a partial light beam $11^V$ of the coupled-in light beam 11 hitting a middle optic strip 15 toward the direction of the two lateral edges 17 of the tapered section for the coupling-in of light 26, on which it is fully reflected in the direction of the main section 5. The wing-shaped, balancing reflective surfaces 29 form grading on the deflecting surface 9. These balancing reflective surfaces 29 bring about, that light from the middle area having a relatively high light intensity and a relatively large angle is guided transversely to the light guiding direction F outward onto the lateral edges 17. By this means, particularly the end section of the illumination section L2 of the surface for the coupling-out of light 4 is illuminated. This results in a homogeneous illumination of the surface for the coupling-out of light 4, even if the distances between the light sources are relatively large.

The light sources 7 are preferably embodied as LED light sources having a Lambertian radiation characteristic.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE SIGNS

1 Light guide
2, 2' Flat sides
4 Surface for the coupling-out of light
5 Main section
6 Section for the coupling-in of light
7 Light source
8 PCB
9 Deflecting surface
10 Surface for the coupling-in of light
11, 11', 11", Light beam
$11^V$
12 Edges
13, 13' Collecting optical surface
14, 14' Peak
15, 15', 15" Optical strip
16, 16' Edge 17 Lateral edge
18 Free lateral side
19 Edge
20 Edge
25 Optical strip
26 Light coupling area for the coupling-in of light
28 Lateral edge
29 Balancing reflective surface
a1, a2 Distance
b Width
d Thickness
l Length
F Light guiding direction
HA Main radiation direction
α Tipping angle
β Angle of incidence
M Middle plane

The invention claimed is:

1. A lighting appliance for vehicles, comprising:
a flat light guide including a section for a coupling-in of light and a multitude of light sources radiating light beams arranged in the section for the coupling-in of light;
a surface for the coupling-in of the light beams in the section for the coupling-in of light in the flat light guide, a deflection surface for the deflection of the coupled-in light beams in the direction of a main section of the light guide, and a surface for a coupling-out of light abutting the deflection surface in the light guiding direction;
the main section of the light guide extending between the section for the coupling-in of light and the surface for the coupling-out of light having opposing flat sides, on which the coupled-in light beam is fully reflective in direction of the surface for the coupling-out of light; and
wherein the surface for the coupling-in of light is embodied so that the coupled-in light beam is directed under an acute tipping angle relative to a main radiation direction of the light source in the direction of the deflecting surface.

2. The lighting appliance according to claim 1, wherein the tipping angle is of a sufficient value such that an angle of incidence of the light beam hitting the deflecting surface is larger than a critical angle of the total reflection on the deflecting surface.

3. The lighting appliance according to claim 1, wherein the section for the coupling-in of light has a collecting optical surface tilted by the tipping angle relative to the main radiation direction of the light source, so that a coupled-in middle partial light beam is deflected by the tipping angle in the direction of the deflecting surface and is then reflected by it in the direction of the main section of the flat light guide, and that the section for the coupling-in of light has a peak for the coupling-in and total reflection of at least one of a first outer partial light beam and a second outer partial light beam in the direction of the deflecting surface.

4. The lighting appliance according to claim 1, wherein the deflecting surface is operable such that the coupled-in light beam enters the main section of the light guide abutting on the section for the coupling-in of light in the light guiding direction.

5. The lighting appliance according to claim 1, wherein from the main section of the light guide, a multitude of light coupling sections for the coupling-in of light, each being aligned toward a light source, protrude transversely relative to the main radiation direction of the light source and relative to the light guiding direction.

6. The lighting appliance according to claim 1, wherein the deflecting surface has a multitude of optical strips with a triangular cross-section widening in the direction of the main section of the light guide.

7. The lighting appliance according to claim 6, wherein the optical strips have two optical surfaces each, forming an edge under an inclusion angle, wherein the inclusion angle of the neighboring optical strip toward a middle plane of the section for the coupling-in of light is embodied larger.

8. The lighting appliance according to claim 7, wherein the edges of the optical strips open up in a fan-shaped manner toward the main section, wherein edges of neighboring light-coupling sections for the coupling-in of light running at a lateral edge of the section for the coupling-in of light abut.

9. The lighting appliance according to claim 6, wherein the optical strips are arranged oriented so that the partial light beam enters the main section in a parallel manner or under an angle of dispersion relative to the light guiding direction.

10. The lighting appliance according to claim 7, wherein in the region of the middle plane, the deflecting surface has a wing-shaped balancing reflective surface which can deflect a partial light beam of the coupled-in light beam hitting a middle optical strip toward the lateral edge of the light coupling area for the coupling-in of light, on which it can be reflected further toward the main section.

* * * * *